United States Patent [19]

Brandmayr et al.

[11] 3,862,829
[45] Jan. 28, 1975

[54] METHOD OF PROCESSING FERROELECTRIC DEVITRIFIABLE GLASS CERAMICS

[75] Inventors: Ronald J. Brandmayr, Ocean; Sam DiVita, West Long Branch, both of N.J.

[73] Assignee: The United States of America as represented by the Secretary of the Army, Washington, D.C.

[22] Filed: Aug. 14, 1973

[21] Appl. No.: 388,308

[52] U.S. Cl. ........................ 65/32, 65/33, 106/39.8
[51] Int. Cl. .............................................. C03c 3/22
[58] Field of Search ........ 65/32, 33; 106/39.6, 39.7, 106/39.8

[56] References Cited
UNITED STATES PATENTS

| | | | |
|---|---|---|---|
| 3,116,137 | 12/1963 | Vasilos et al. ..................... | 65/33 X |
| 3,459,503 | 8/1969 | Roy et al. ......................... | 65/33 X |
| 3,490,887 | 1/1970 | Herczog et al. .................... | 65/33 |
| 3,503,717 | 3/1970 | Wilson et al. ...................... | 65/33 X |

FOREIGN PATENTS OR APPLICATIONS

| | | | |
|---|---|---|---|
| 1,444,001 | 5/1966 | France .............................. | 106/39.7 |

*Primary Examiner*—Robert L. Lindsay, Jr.
*Attorney, Agent, or Firm*—Roy E. Gordon; Eugene E. Stevens, III; Frank J. Dynda

[57] ABSTRACT

The electrical properties of ferroelectric devitrifiable glass ceramics are improved by subjecting the ceramics to inert gas pressures of about 5,000 pounds per square inch to about 50,000 pounds per square inch at temperatures from about 700° C. to about 1,100° C. for about 15 minutes to about 2 hours.

5 Claims, No Drawings

METHOD OF PROCESSING FERROELECTRIC DEVITRIFIABLE GLASS CERAMICS

This invention relates to a method of improving the electrical properties of ferroelectric devitrifiable glass ceramics.

BACKGROUND OF THE INVENTION

Heretofore, ferroelectric devitrifiable glass ceramics have generally been processed by laminating techniques in which green monolithic structures are prepared and then devitrified and densified by suitable heat treatment without the use of pressure. The foregoing technique, though satisfactory for some applications, does not result in optimum properties where high energy storage is desired.

SUMMARY OF THE INVENTION

The general object of this invention is to provide a method of improving the electrical properties of ferroelectric devitrifiable glass ceramics. A further object of the invention is to provide such a method that will result in glass ceramics suitable for high energy storage applications.

The foregoing objects have now been attained by processing the ferroelectric devitrifiable glass ceramics in a high pressure gas autoclave using inert gas pressures of about 5,000 pounds per square inch to about 50,000 pounds per square inch at temperatures of about 700° C. to about 1,100° C. for about 15 minutes to about 2 hours.

Any of the ferroelectric devitrifiable glass ceramics can be used in the invention. Such ceramics include barium strontium niobate devitrifiable glass ceramic, barium strontium titanate devitrifiable glass ceramic, and lead zirconate-lead titanate devitrifiable glass ceramic. The samples used in the method of the invention are prepared in monolithic form by the usual techniques of blade casting and are in the form of a true glass.

The devitrifiable glass samples are then loaded in a high pressure gas autoclave and subjected to inert gas pressure. The autocalve used can conveniently be a cold walled, internally heated, high pressure vessel adapted to facilitate gas pressure compactions of metals and ceramics. The glass ceramics can be placed in contact with platinum, mica, or noble metal where supporting structure is required. The ferroelectric devitrifiable glass ceramics can be placed in the autocalve either encapsulated in a suitable container such as stainless steel or platinum, or in the alternative, can be placed in the autoclave in non-encapsulated form. When the ferroelectric devitrifiable glass ceramic is encapsulated in a metal container, the metal container is back-filled with oxygen. This is to compensate for loss of oxygen due to getter action of the metal container; and because it is desirable to maintain oxygen stoichiometry in the dielectric for best electrical properties. The samples are then exposed to appropriate conditions of temperature, pressure, and time during which the glass samples are devitrified under pressure and yield improved microstructures and electrical properties.

DESCRIPTION OF THE PREFERRED EMBODIMENT

EXAMPLE 1

Barium strontium niobate devitrifiable glass ceramic in sealed monolithic form is wrapped loosely in amber mica sheets and placed in a high pressure gas autocalve. The sample is then subjected to argon gas pressures of 10,000 p.s.i. to 30,000 p.s.i. at a temperature about 775° C. for 1 hour. The autocalve is cooled to room temperature and the resulting monolithic dielectric body removed. The devitrified body obtained is characterized by a uniform microstructure having a grain size less than 0.1 micron. It has a dielectric constant of 380, which is an improvement of 25 percent over bodies prepared by the current state of the art. The body prepared by the method of this invention is further characterized by a dielectric strength of up to 3,000 volts per mil, a dissipation factor below 0.25 percent, a more stable coefficient of dielectric constant under DC stress that is improved from a 20 percent change at 500 volts per mil to only a 14 percent change at 500 volts per mil, and zero porosity when compared to bodies prepared by the current state of the art.

EXAMPLE 2

The method is the same as in the preferred embodiment except that the sample is enclosed in an evacuated steel container. In this instance, the steel container is outgassed at 100° C. for 30 minutes, flushed with oxygen, back filled with 6 pounds per square inch of oxygen pressure and sealed with the sample inside.

EXAMPLE 3

A barium strontium titanate devitrifiable glass ceramic is placed in a high pressure gas autoclave and subjected to helium gas pressures of 10,000 to 30,000 p.s.i. at 1,100° C. for about 1 hour. The autoclave is cooled to room temperature and the resulting devitrified body removed. It is characterized by a dense, uniform microstructure less than 0.1 micron in size.

EXAMPLE 4

A lead zirconate-lead titanate devitrifiable glass ceramic is placed in a high pressure gas autoclave and subjected to argon gas pressures of 10,000 to 30,000 p.s.i. at 1,000° c. for about 1 hour. The autocalve is cooled to room temperature and the resulting devitrified body removed. The body is characterized by a dense, uniform microstructure less than 0.1 micron in size.

We wish it to be understood that we do not desire to be limited to the exact details of construction shown and described, for obvious modifications will occur to a person skilled in the art.

What is claimed is:

1. Method of improving the electrical properties of ferroelectric devitrifiable glass ceramics selected from the group consisting of barium strontium niobate devitrifiable glass ceramic, barium strontium titanate devitrifiable glass ceramic, and lead zirconate - lead titanate devitrifiable glass ceramic comprising subjecting the ferroelectric devitrifiable glass ceramics to inert gas pressures of about 5,000 pounds per square inch to about 50,000 pounds per square inch at temperatures from about 700°C. to about 1,100°C. for about fifteen minutes to about 2 hours; the devitrified body so obtained being characterized by a uniform microstructure having a grain size less than 0.1 micron.

2. Method according to claim 1 wherein the ferroelectric devitrifiable glass ceramic is barium strontium niobate devitrifiable glass ceramic, the temperature is about 775°C., and the inert gas pressure is about 10,000 to about 30,000 pounds per square inch of helium; the devitrified body so obtained being characterized by a dielectric constant of 380, a dielectric strength of up to 3,000 volts per mil, a dissipation factor below 0.25 percent, and a more stable coefficient of dielectric constant under DC stress that is improved from a 20 percent change at 500 volts per mil to only a 14 percent change at 500 volts per mil.

3. Method according to claim 1 wherein the ferroelectric devitrifiable glass ceramic is barium strontium titanate devitrifiable glass ceramic, the temperature is about 900° C., and the inert gas pressure is about 10,000 to about 30,000 pounds per square inch of argon.

4. Method according to claim 1 wherein the ferroelectric devitrifiable glass ceramic is lead zirconate-lead titanate devitrifiable glass ceramic, the temperature is about 750° C., and the inert gas pressure is about 10,000 to about 30,000 pounds per square inch of argon.

5. Method according to claim 1 in which the ferroelectric devitrifiable glass ceramic is encapsulated in a stainless steel container back filled with oxygen prior to subjecting the ceramic to the inert gas pressures.

* * * * *